(12) United States Patent
Hu (10) Patent No.: US 10,411,859 B2
(45) Date of Patent: *Sep. 10, 2019

(54) COMMUNICATION DEVICE TO GENERATE AND PROCESS A CLEAR TO SEND ANNOUNCEMENT FRAME

(71) Applicant: Avago Technologies International Sales Pte. Limited, Singapore (SG)

(72) Inventor: Chunyu Hu, Sunnyvale, CA (US)

(73) Assignee: Avago Technologies International Sales Pte. Limited (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,158

(22) Filed: Jul. 23, 2018

(65) Prior Publication Data

US 2018/0351716 A1    Dec. 6, 2018

Related U.S. Application Data

(63) Continuation of application No. 14/985,972, filed on Dec. 31, 2015, now Pat. No. 10,033,495.

(60) Provisional application No. 62/116,158, filed on Feb. 13, 2015.

(51) Int. Cl.
*H04W 4/00*   (2018.01)
*H04L 5/00*   (2006.01)
*H04L 29/12*  (2006.01)

(52) U.S. Cl.
CPC ........ *H04L 5/0048* (2013.01); *H04L 61/6004* (2013.01); *H04L 61/6022* (2013.01)

(58) Field of Classification Search
CPC ................... H04L 61/6004; H04L 61/6022
See application file for complete search history.

(56) References Cited

U.S. PATENT DOCUMENTS

| | | |
|---|---|---|
| 2007/0153755 A1 | 7/2007 | Yang et al. |
| 2007/0190942 A1* | 8/2007 | Wentink ............... H04W 74/08 455/41.2 |
| 2008/0080553 A1 | 4/2008 | Hasty et al. |
| 2009/0225697 A1* | 9/2009 | Solomon ............ H04W 72/046 370/328 |
| 2010/0014463 A1 | 1/2010 | Nagal et al. |
| 2012/0309321 A1 | 12/2012 | Agarwal et al. |
| 2014/0307625 A1 | 10/2014 | Wentink |
| 2016/0241368 A1 | 8/2016 | Hu |

\* cited by examiner

*Primary Examiner* — Chi H Pham
*Assistant Examiner* — Fahmida S Chowdhury
(74) *Attorney, Agent, or Firm* — Sterne, Kessler, Goldstein & Fox P.L.L.C.

(57) ABSTRACT

A communication device configured to generate a clear-to-send (CTS)-Announcement frame and to transmit the CTS-Announcement frame to one or more other communication devices. The CTS-Announcement frame can include an organizationally unique identifier (OUI) and a portion of network interface controller (NIC) identifier, and announcement information of the device's activities and/or state.

20 Claims, 7 Drawing Sheets

CTS Announcement Frame

FIG.3 : RTS/CTS/DATA/ACK Frame Sequence

FIG. 4 : RTS/CTS Frame Format

FIG. 5 : CTS Frame Format with Address Details

FIG. 6 : CTS Announcement Frame

FIG. 7

//COMMUNICATION DEVICE TO GENERATE AND PROCESS A CLEAR TO SEND ANNOUNCEMENT FRAME

CROSS REFERENCE TO RELATED APPLICATIONS

This application is a continuation of U.S. patent application Ser. No. 14/985,972, filed Dec. 31, 2015, which claims the benefit of U.S. Provisional Patent Application No. 62/116,158, filed on Feb. 13, 2015, both of which are incorporated by reference herein in their entireties.

BACKGROUND

Technical Field

This application relates to wireless communications.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

In the mobile communication area, one of the widely used protocols for use in communicating over a wireless local area network (WLAN) is the IEEE 802.11 protocol, including the various versions of the 802.11 protocol, such as 802.11a, 802.11b, 802.11g, 802.11n, and 802.11ac, etc. The IEEE 802.11 a/b/g protocols generally transmit at a carrier frequency of 2.4 GHz or 5.0 GHz utilizing a single antenna, while 802.11n/802.11ac utilize multiple antennas implementing a technique commonly called Multiple-Input-Multiple-Output (MIMO).

The IEEE 802.11 protocol is established as a standard and is utilized extensively in wireless communications. A common network implementation for a WLAN is a Basic Service Set (BSS), in which components of the BSS communicate with each other. The BSS may be a system including a central coordinating device, such as an Access Point (AP), and one or more Stations (STA), e.g. mobile devices. In some instances, components of a BSS may form an ad-hoc system, known as Independent Basic Service Set (IBSS). A BSS may be a more complicated system as well, in which STAs may communicate with one another via peer-to-peer communication without utilizing an AP. In some instances, a device may communicate separately with its own subset of devices via a peer-to-peer link, such as a piconet.

Figure 1:
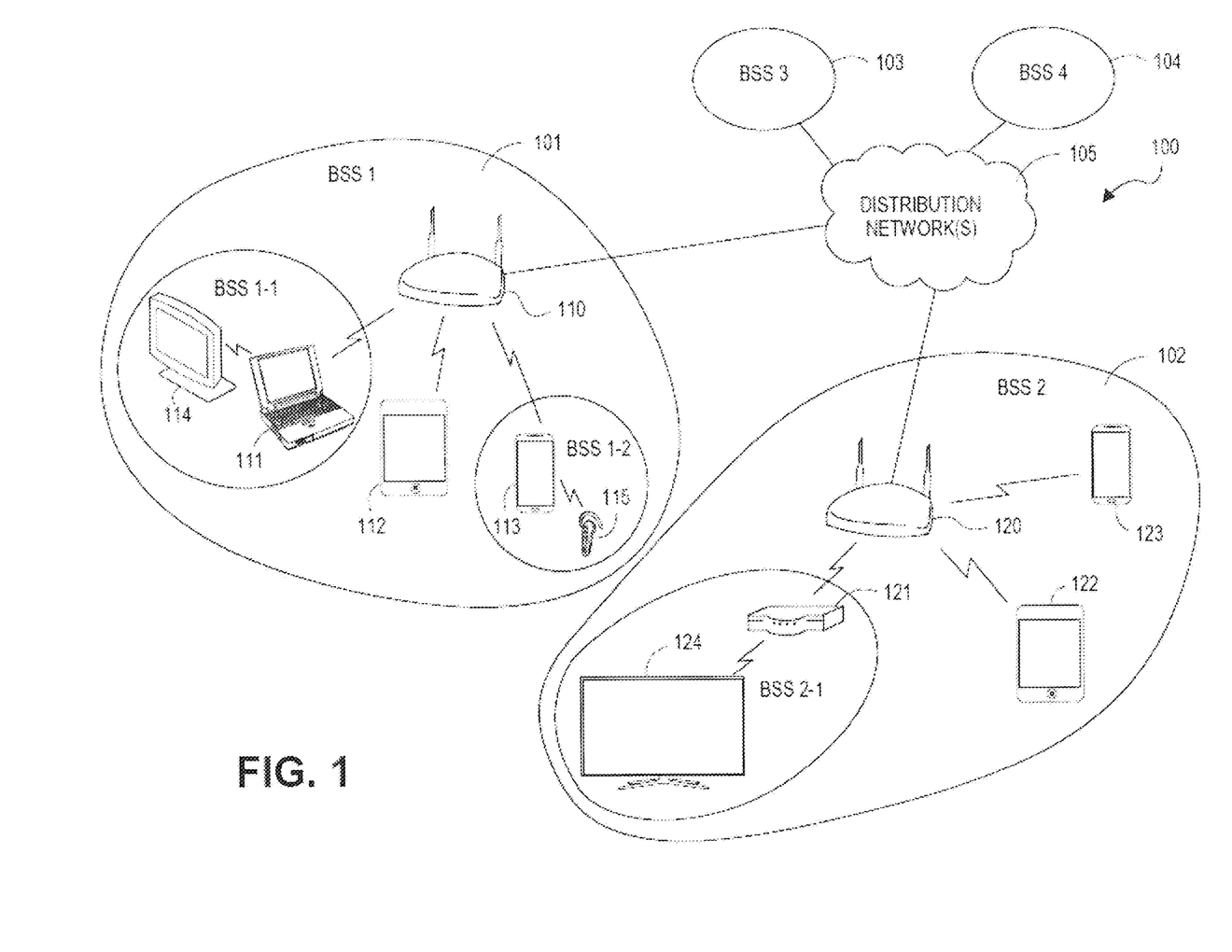
FIG. 1 illustrates a system diagram of an example wireless communication network connecting a number of different wireless devices in multiple Basic Service Sets (BSSs) in accordance with the present disclosure.

FIG. 1 shows a system 100 that is an example wireless communication network connecting a number of different wireless devices in multiple Basic Service Sets (BSSs). Generally, a BSS is a group of devices that are connected by wireless communication links (such as WLAN) to communicate among the devices in the group. A BSS typically has a unique identifier and operates utilizing a communication protocol, such as one of the versions of the IEEE 802.11 protocol. The BSS may have components that communicate through a control point (such as an access point), communicate ad-hoc and/or communicate peer-to-peer between devices. A given BSS may configure a number of devices to operate within the BSS to communicate among the devices or between two devices (e.g. peer-to-peer). In some instances, two devices may operate as a de facto BSS.

In the particular example for system 100 of FIG. 1, a plurality of BSSs 101-104 are shown as configured to operate with one or more distribution network(s) 105. BSSs 101-104 (also noted respectively as BSS1, BSS2, BSS3 and BSS4) may operate independently of one another. Although BSSs 1-4 are configured via network 105, one or more BSSs may use different distribution network(s). System 100 shows a single tie-in of the BSSs via network(s) 105 for simplicity of explanation. Alternatively BSSs may be configured via different networks.

For system 100, BSS1 has a plurality of devices communicating through an access point (AP) 110. In system 100, device 111 is a notebook computer or a personal computer (PC) with a wireless capability, device 112 is a tablet computing device and device 113 is a mobile phone (such as a smartphone), in which devices 111-113 communicate with AP 110.

BSS1 also includes a wireless display device 114, which communicates wirelessly with device 111 in a peer-to-peer fashion, and a wireless audio device 115, which communicates with device 113 in a peer-to-peer fashion. In one example, device 114 provides a larger viewing platform for the notebook computer 111, and device 115 provides a wearable headphone/microphone extension to the smartphone 113. The two peer-to-peer connections may utilize a localized piconet, which operates separately within the BSS1. Accordingly, the two peer-to-peer connections in BSS1 are noted as BSS1-1 and BSS1-2. In some instances, such as for WLAN Direct peer-to-peer communications, an AP may not be present.

Likewise, BSS2 includes a number of devices communicating through an AP 120. Device 121 is a set-top box, device 122 is a tablet computer and device 123 is a mobile phone (e.g. a smartphone). Set-top box 121 communicates with a television set 124 for displaying various programs as well as accessing on-line content. Although television 124 may communicate via AP 120, a peer-to-peer link may be established between set-top box 121 and television 124, which is noted as BSS2-1. System 100 also shows two other BSSs 103 and 104 (BSS3 and BSS4) which have various devices and components configured within those BSSs.

The various BSSs 101-104 may operate completely independent of other BSSs, but when a particular BSS is within a communication vicinity of one or more of the other BSSs, potential problems may develop between the two or more BSSs. As an example, a collision may result from two or more BSSs attempting to acquire the same frequency channel. The problems arise because the various BSSs 101-104 use the same 2.4 GHz or 5 GHz frequency band for their communications. The IEEE 802.11 protocol can utilize both a physical carrier sensing and a virtual carrier sensing mechanism to mitigate such medium contention and collisions.

Figure 2:
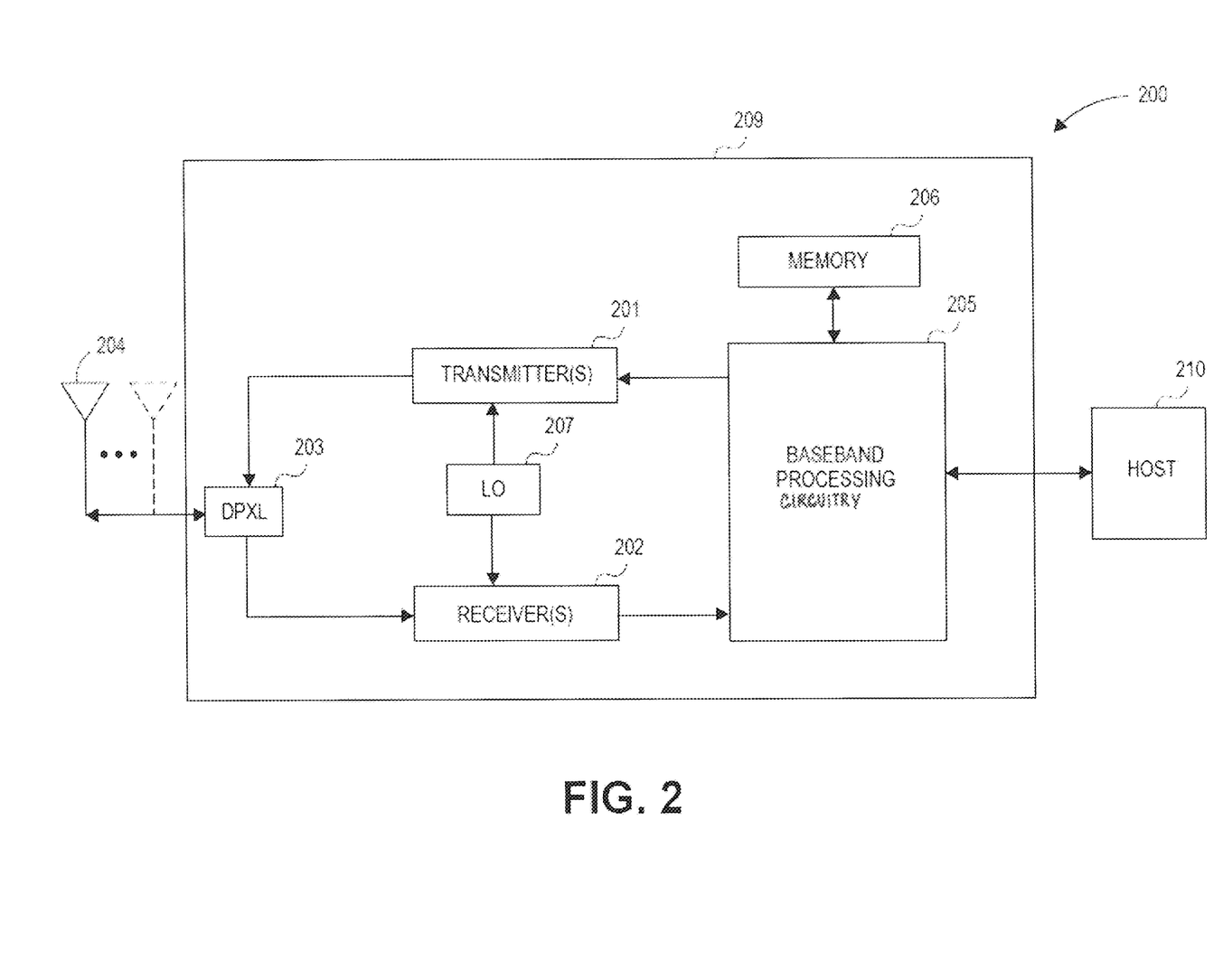
FIG. 2 illustrates a wireless communications device according to an exemplary embodiment of the present disclosure.

FIG. 2 is an example wireless device 200 that further defines one or more of the devices in FIG. 1. Device 200 includes one or more transmitter(s) 201, one or more receiver(s) 202, one or more local oscillator(s) (LO) 207, baseband processor circuitry 205, and a memory 206. Baseband processor circuitry 205 provides baseband processing operations for incoming and outgoing signals. In embodiments, baseband processor circuitry 205 includes a digital-signal-processor (DSP), and may also include a plurality of baseband processors and/or circuits. The processor circuitry 205 can further include, or be coupled to, a memory 260 (as shown) that stores data and/or instructions, where when the instructions are executed by the processor(s) 205, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM), or other known hardware memories. The memory 260 can be non-removable, removable, or a combination of both.

Baseband processor circuitry 205 may be coupled to a host (e.g. host processor), applications processor or other unit(s) that provides operational processing for the device and/or interface with a user. In FIG. 2, a host processor 210 is shown. Host processor 210 may be part of the device or it may be a separate. For example, host processor 210 may represent an application portion of an application processor.

Transmitter 201 and receiver 202 provide for up-conversion and down-conversion of outgoing and incoming signals, respectively. In devices where multiple streams are utilized, such as for MIMO operation, a plurality of transmitters and receivers may be included to operate on the multiple in-bound and/or out-bound streams. Where multiple transmitters and receivers are present, multiple LOs 207 may be used as well.

Transmitter(s) 201 and receiver(s) 202 couple to a duplexer (DPXL) 203, which couples to one or more antenna(s) 204. The duplexer 203 separates outgoing transmit signals from incoming receive signals, using for example one or more filters. A transmit/receive (T/R) switch or other equivalent switching or multiplexing component may be used instead of DPXL 203. Likewise, a variety of antennas or antenna arrays may be used for one or more antenna(s) 204.

Outbound data for transmission from host 210 is coupled to baseband processor circuitry 205 and converted to baseband signals and then coupled to transmitter 201. Transmitter 201 up-converts the baseband signals, using a local oscillator signal from LO 207, to provide outbound radio frequency (RF) signals for transmission from antenna(s) 204. Transmitter 201 may utilize one of a variety of up-conversion or modulation techniques (whether direct conversion or through multiple conversion steps) to up-convert the outbound baseband signals to outbound RF signal. Those skilled in the relevant art(s) will recognize that the transmitter 201 can include (but is not limited to) a digital signal processor (DSP), data modulator, a digital-to-analog converter (DAC), and a frequency converter (including mixer(s) that operate with local oscillator 207, and filters) to provide some examples.

In a similar manner, inbound RF signals are received by antenna(s) 204 and coupled to receiver 202. Receiver 202 then down-converts the inbound RF signals to inbound baseband signals, using a local oscillator signal from LO 207, which are then coupled to baseband processor circuitry 205. Receiver 202 may utilize one of a variety of down-conversion or demodulation techniques (whether direct conversion or through multiple conversion steps) to down-convert the inbound RF signals to inbound baseband signals. The inbound baseband signals are processed by baseband processor circuitry 205 and inbound data is output from baseband processor circuitry 205 to host processor 210. Those skilled in the relevant art(s) will recognize that the receiver 202 can include (but is not limited to) a frequency converter (including mixer(s) that operate with local oscillator 207, and filters), a demodulator, an analog-to-analog converter (ADC), and a DSP, to provide some examples.

LO 207 provides local oscillation signals for use by transmitter 201 for up-conversion and by receiver 202 for down-conversion. In some embodiments, separate LOs may be used for transmitter 201 and receiver 202. Although a variety of LO circuitry may be used, in some embodiments, a Phase-Locked Loop (PLL) is utilized to lock the LO to a frequency stable LO signal based on a selected frequency.

In one embodiment, baseband processor circuitry 205, LO 207, memory 206, transmitter 201, and receiver 202 are integrated on a same integrated circuit (IC) chip 209. Transmitter 201 and receiver 202 are typically referred to as the RF front-end. In other embodiments, one or more of these components may be on separate IC chips. Similarly, other components shown in FIG. 2 may be incorporated on the same IC chip, along with baseband processor circuitry 205, LO 207, transmitter 201 and receiver 202. In some embodiments, the antenna 204 may also be incorporated on the same IC chip as well. Furthermore, with the advent of system-on-chip (SOC) integration, host devices, application processors and/or user interfaces, such as host processor 210, may be integrated on the same IC chip along with baseband processor circuitry 205 and the radio front-end.

Additionally, although one transmitter 201 and one receiver 202 are shown in FIG. 2, other embodiments may utilize multiple transmitters and receivers, as well as multiple LOs, as will be understood by those skilled in the art. For example, multiple input and/or multiple output communications, such as multiple-input-multiple-output (MIMO) communication, may utilize multiple transmitters 201 and/or receivers 202 (as well as multiple Los 207) as part of the RF front-end.

In an exemplary embodiment, the wireless device 200 is configured for wireless communications conforming to IEEE's 802.11 WLAN specification. In this example, the wireless device 200 can be referred to as WLAN transceiver 200. Those skilled in the relevant art(s) will understand that the transceiver 200 is not limited to communication conforming to the IEEE 802.11 WLAN specification, and can be configured for communications that conform to other applicable wireless communication protocol, e.g. WiMax and ZigBee (IEEE 802.15.4).

In the wireless communication illustrated by the exemplary embodiment in FIG. 1, medium access is coordinated as specified by the IEEE 802.11 WLAN Media Access Control (MAC) protocol to avoid collisions so a transmission can be received successfully by the receiver. The enabling technologies include both a physical carrier sensing (CS) mechanism and a virtual carrier sense mechanism. The former is known as listen-before-talk, that is, a wireless device has to try to detect wireless signals over the communication channel and/or energy over the air and hold off transmission if the medium is found busy. The virtual CS mechanism is achieved by distributing reservation information announcing the impending use of the medium. The exchange of Request-To-Send (RTS) and Clear-to-Send (CTS) frames prior to the transmission of the actual data frame is one means of distributing this medium reservation information. The RTS and CTS frames contain a Duration field that defines the period of time that the medium is to be reserved for transmission of the actual data frame and the return of the ACK frame. A STA receiving either the RTS (sent by the originating STA) or the CTS (sent by the destination STA) shall process the medium reservation. Thus, a STA might be unable to receive signals from the originating STA and yet still know about the impending use of the medium to transmit a data frame.

Figure 3:
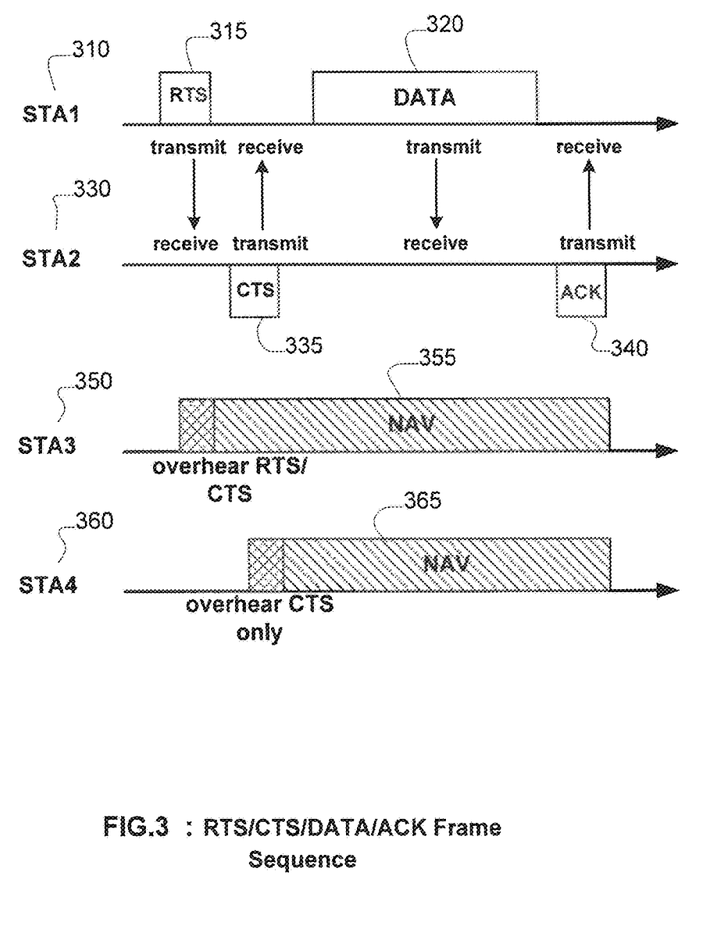
FIG. 3 illustrates a frame exchange sequence according to an exemplary embodiment of the present disclosure.

FIG. 3 illustrates such a RTS and CTS exchange sequence. There are four STAs, 310, 330, 350, and 360 in the communication system, such as a WLAN. STA1 310 transmits an RTS frame 315 destined for STA2 330. STA2 330, after receiving RTS 315, responds with a CTS frame 335 and completes the RTS/CTS handshake. STA1 310 then proceeds to transmit DATA frame 320 to STA2 330, which responds with an ACK frame 340, completing the whole data frame transmission sequence. The RTS/CTS frames include a duration field that identifies the time of the DATA/ACK frame exchange following the RTS/CTS frames, respectively. There are two other stations, STA3 350 and STA4 360 in FIG. 3 contending for medium access as well. When STA3 350 receives the RTS frame 315 and the CTS frame 335, and it finds out from their duration field that other stations (e.g. STAs 310, 330) have reserved the medium for the time duration specified in the RTS/CTS frame. According to the IEEE 802.11 MAC protocol, STA3 will set up a network allocation vector (NAV) 355 to mark the medium during the identified time duration as busy. STA4 360, on the other hand, couldn't receive RTS 315 successfully, but it does receive CTS 335 successfully. It will also set up its NAV 365 and mark the medium as busy during the DATA 320 and ACK 340 exchange time.

Figure 4:
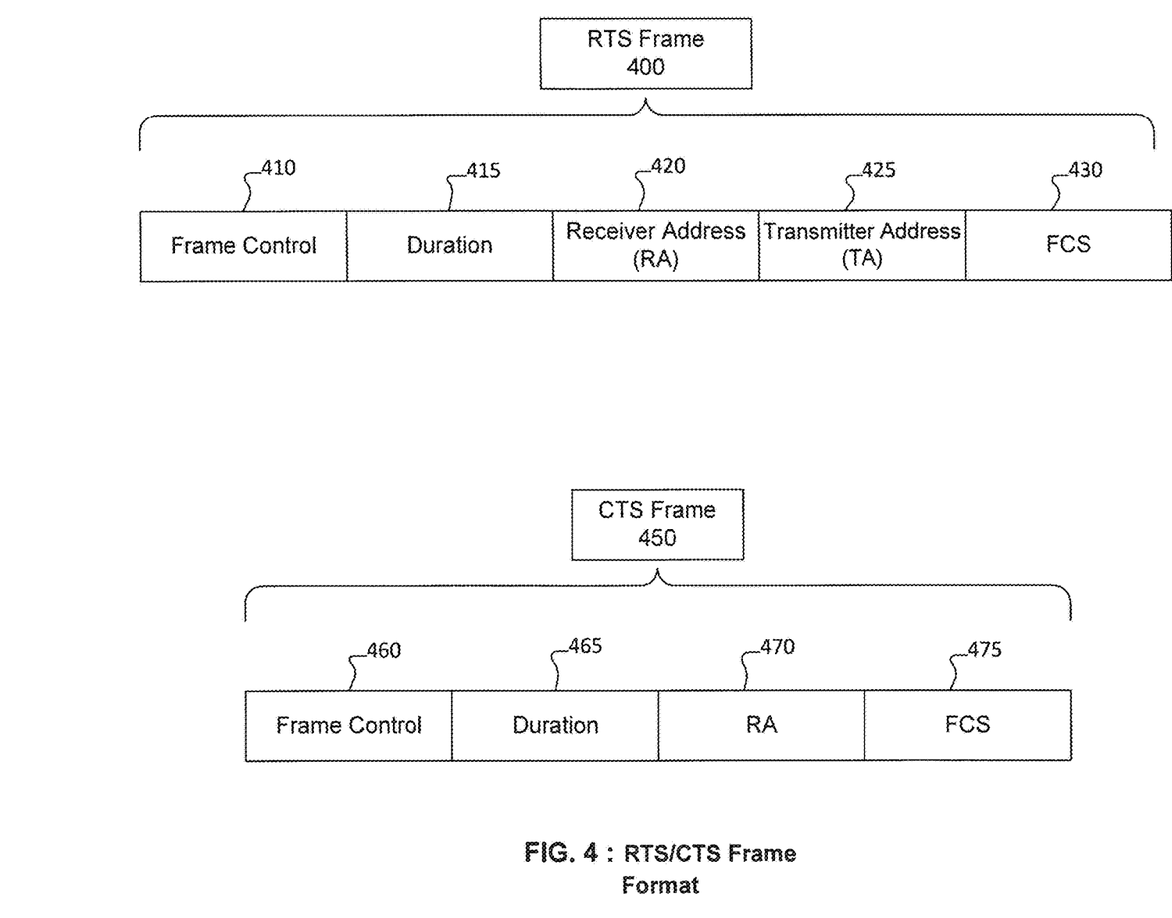
FIG. 4 illustrates a frame structure according to an exemplary embodiment of the present disclosure.

FIG. 4 illustrates the RTS and CTS frame format that representative of RTS frame 315 and CTS frame 335, respectively. The RTS frame 400 includes fields 410-430, including: a Frame Control field 410, a Duration field 415, a Receiver Address (RA) field 420, a Transmitter Address (TA) field 425, and a Frame Check Sequence (FCS) field 430. The CTS frame 450 includes fields 460-475, including: Frame Control 460, Duration 465, RA 470, and FCS 475, similar to the RTS frame, except that it doesn't have a TA field.

Furthermore, in the virtual carrier sensing mechanism, any individually addressed frame can contain the duration field to distribute the medium reservation information. This field identifies the time that the medium is reserved, either to the end of the immediately following ACK, or in the case of a multi-frame sequence, to the end of the ACK following the last frame in the sequence. Therefore, a wireless device can send out a CTS frame independent of the RTS/CTS handshake to reserve the medium. However, when being transmitted not as a response to an RTS frame, a CTS frame should be designed carefully in order to avoid confusion in the communication protocol. For example, if a device uses a random address in such a CTS frame's RA field and by chance this address is the same as another device's network address within communication range, the CTS frame can be mistaken by that device as a response frame to RTS frames it transmitted. The following DATA frame transmission can result in collision, wasting devices' energy and degrading network efficiency.

Figure 5:
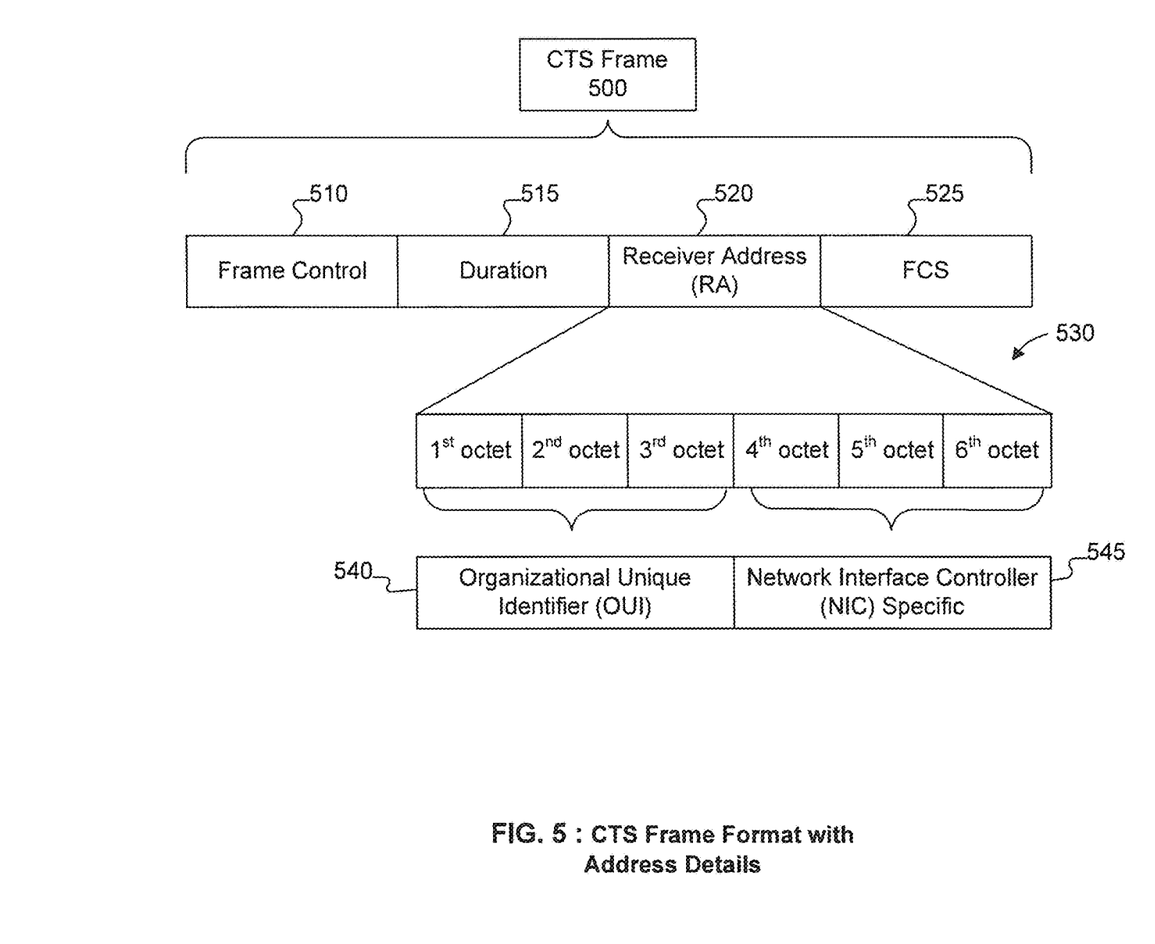
FIG. 5 illustrates a frame structure according to an exemplary embodiment of the present disclosure.

FIG. 5 illustrates a CTS 500 that further defines CTS frame 400 according to embodiments of the disclosure. Accordingly, CTS 500 includes frame control field 510, duration field 515, receiver address field (RA) 520, and frame check sequence field (FCS) 525. In FIG. 5, the RA field included in the CTS frame is an instance of a Media Access Control (MAC) address used in IEEE 802 networks, including both Ethernet and WLAN networks. A wireless device such as devices 110-115, 120-124 in FIG. 1, or 200 in FIG. 2, can have multiple Network Interface Controllers (NICs) and each NIC has a unique MAC address. To distribute MAC addresses systematically and with uniqueness, the IEEE divides the address bytes 530 in transmission order into two parts: Organizational Unique Identifier (OUI) 540 and NIC specific identifier 545. The OUI 540 is assigned by the IEEE to an organization such as a manufacture or a device vendor, and then the organization (e.g. manufacturer) assigns the following NIC specific identifier 545 freely, without concern for name confliction with an address assigned by another organization. Of course, any organization should manage the NIC specific address space carefully to avoid duplicate addresses within its own organization. An organization can own more than one OUI. As shown in FIG. 5, in one particular example, bytes 530 in the RA field 520 are apportioned so that the bytes 1-3 are used for the OUI identifier 540 and bytes 4-6 are used for the NIC specific identifier 545. However, other apportionments and/or locations can be used without deviating from the scope and spirit of the disclosure.

Figure 6:
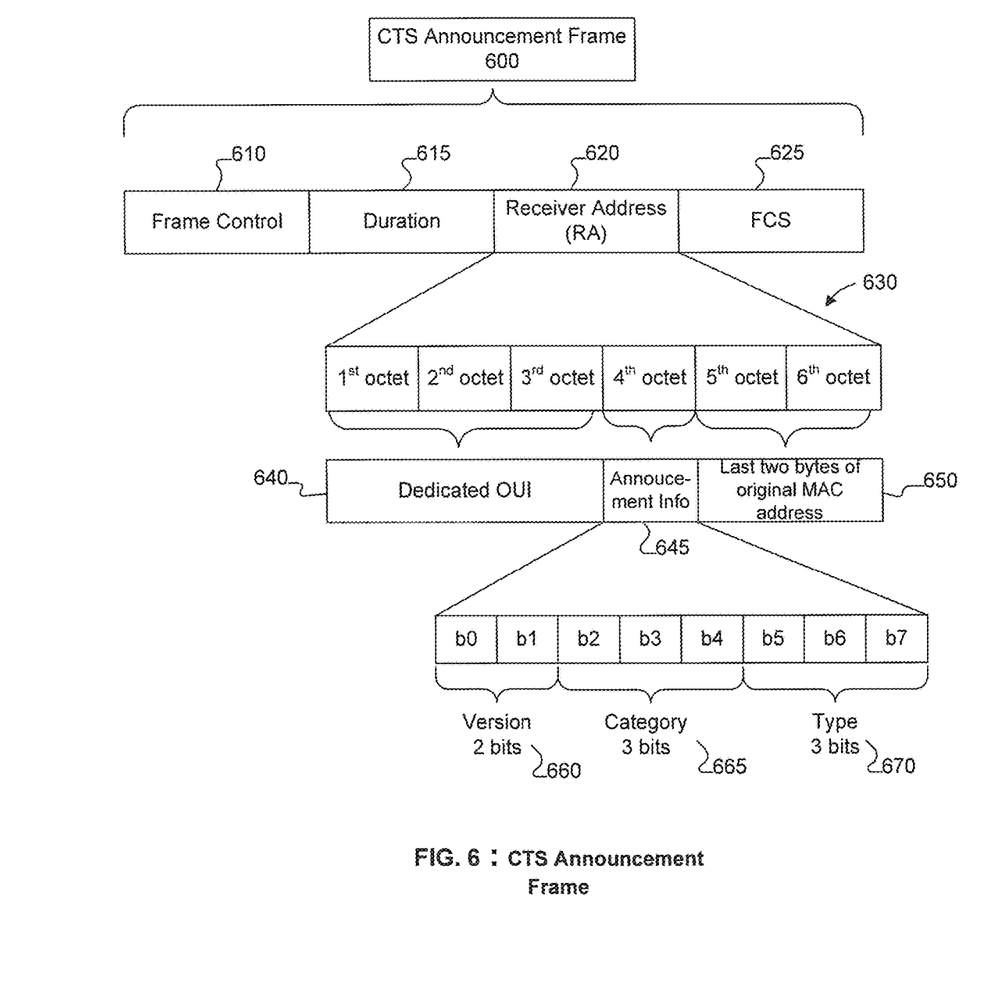
FIG. 6 illustrates a network interface controller identifier according to an exemplary embodiment of the present disclosure.

This disclosure presents a modified CTS frame that includes medium reservation, and additionally an announcement of a device's upcoming activity, according to embodiments of the disclosure. In furtherance thereof, FIG. 6 shows an exemplary format of a CTS-Announcement (CTS-A) frame formed from bytes 630, according embodiments of the disclosure. CTS frame 600 has FC field 610, Duration field 615, RA field 620, and FCS field 625. The fields 610, 615, and 625 are similar to the corresponding ones of CTS frame 500. However, the RA field 620 is designed to have a dedicated OUI field 640, an Announcement information field 645, and the remaining part of the original network interface's MAC address 650. In an embodiment, the OUI 640 is dedicated for such CTS-A frames and will not be assigned to represent any actual network device (or group of devices), so as to differentiate the frame and purpose. In other words, the communications devices in the corresponding network are configured to recognize a particular OUI 640 as an identifier of a CTS-A frame, thereby extending or modifying the interpretation of an OUI by the network devices. In the exemplary embodiment, the announcement information field 645 contains three fields: version 660, category 665 and type 670, discussed further below.

In FIG. 6, the dedicated OUI 640 occupies bytes 1-3 of the receiver address (RA) field 620. The dedicated OUI 640 not only distinguishes a CTS-A frame from a non-CTS-A frame, but also provides organization identification and enables the organization to deploy certain proprietary features and/or protocols among all devices that can recognize this CTS-A OUI. The announcement info field 645 can occupy byte 4 and provides details of the purpose of this CTS-A frame, which is not limited to reserving medium access. The remaining part of the address field 650 keeps the corresponding part of the original NIC address, bytes 5 and 6 in the example. While a partial unique MAC address cannot warrant global uniqueness, it helps identify the device in a local network within communication range that transmits the CTS-A frame. As will be understood by those skilled in the arts, other address field configurations (e.g. byte delineations) can be used without departing from the scope and spirit of the disclosure.

The CTS-A frame can be used for many purposes which are not limited to medium reservation. In an exemplary scenario, a wireless device, such as device 110 in FIG. 1, needs to perform some device calibration for a short period of time. In order not to disrupt the service to other associated clients such as device 112 in FIG. 1, it can transmit a CTS-A frame informing devices in the communication range. The announcement information field 645 will convey specific information about the calibration. When another device receives the CTS-A frame, if it is configured so that it is unable to identify such CTS-A frame, it will conform to the virtual carrier sense rule and not transmit during the time specified in the CTS-A frame's Duration field 615. However, for devices that can recognize such CTS-A frame format, they only need to refrain from transmitting frames to devices with the last two bytes of MAC addresses matching the last two bytes of RA address 620 in the received CTS-A frame, but they can communicate with other devices. For example, device 111 can continue to perform transmission to device 114 in FIG. 1. As the result, the overall network utilization is improved.

Another exemplary usage of the CTS-A frame is flow control. An exemplary device as illustrated in FIG. 2 can be memory constrained at times. In some circumstances, a device can be short of memory space for a short of period of time due to various reasons such as: high demand on both active transmission and receive streams, a slow and bursty communication bus, or a temporary host resource shortage, among other reasons. However, there has been lack of a means at the MAC layer to notify the peer devices of its memory shortage. The CTS-A frame described herein can be used to implement a flow control mechanism. The device that is short of memory can transmit a CTS-A frame with announcement information in the field 645 that conveys its memory shortage state. Upon receipt by another device, the transmitter will hold off the transmission for the time specified in the CTS-A frame or wait for the receiver (i.e. sender of the CTS-A frame) to announce that the memory shortage has been resolved, one or both of which can be indicated by further implementation details of the announcement info field 645 and the designed flow control protocol. The design of version field 660, category field 665 and type field 670 illustrated in FIG. 6 allows flexibility of various protocol design and future extension.

In an exemplary embodiment, and with continued reference to FIG. 6, bits 0-1 of the announcement information field 645 (e.g. byte 4) can define one or more announcement versions. For example, bits 0-1 can define four announcement versions identified as versions zero to three. Bits 2-4 of the byte 4 of the announcement information field 645 can define one or more mode categories—such as, for example, legacy protection, calibration, coexistence operation, other basic service set (OBSS) protection, and/or one or more other categories—such as, for example, bandwidth information, interference information, etc. —as will be understood by those skilled in the relevant arts. In operation, the bits 2-4 can define, for example, seven mode categories and each of the versions includes a set of mode categories. That is, by having a 2-bit version range of 0-3, where each 3-bit version includes eight categories, the version bits 0-1 and categories bits 2-4 can define 32 different mode categories.

In these examples, the legacy protection mode can identify whether the communication system 100 will maintain, or is maintaining support for legacy communications protocols, such as, for example, 802.11b, 802.11g, etc. The calibration mode can identify that during the time specified in the Duration field of the CTS-Announcement frame 600, the device will be performing calibration and cannot participate in normal communication with other devices. The coexistence operation mode can identify whether the transmitting device and/or one or more other devices supports and/or will be utilizing coexistence functionality using one or more other communication protocols (e.g., BTCX, LTECX, WLCX, etc.). The OBSS protection mode can identify whether any protection procedures are to be utilized.

Bits 5-7 of the byte 4 of the announcement info field 645 can be reserved for additional information—such as, for example, bandwidth information, interference information, and/or any other information as would be understood by those of ordinary skill in the relevant arts.

Figure 7:
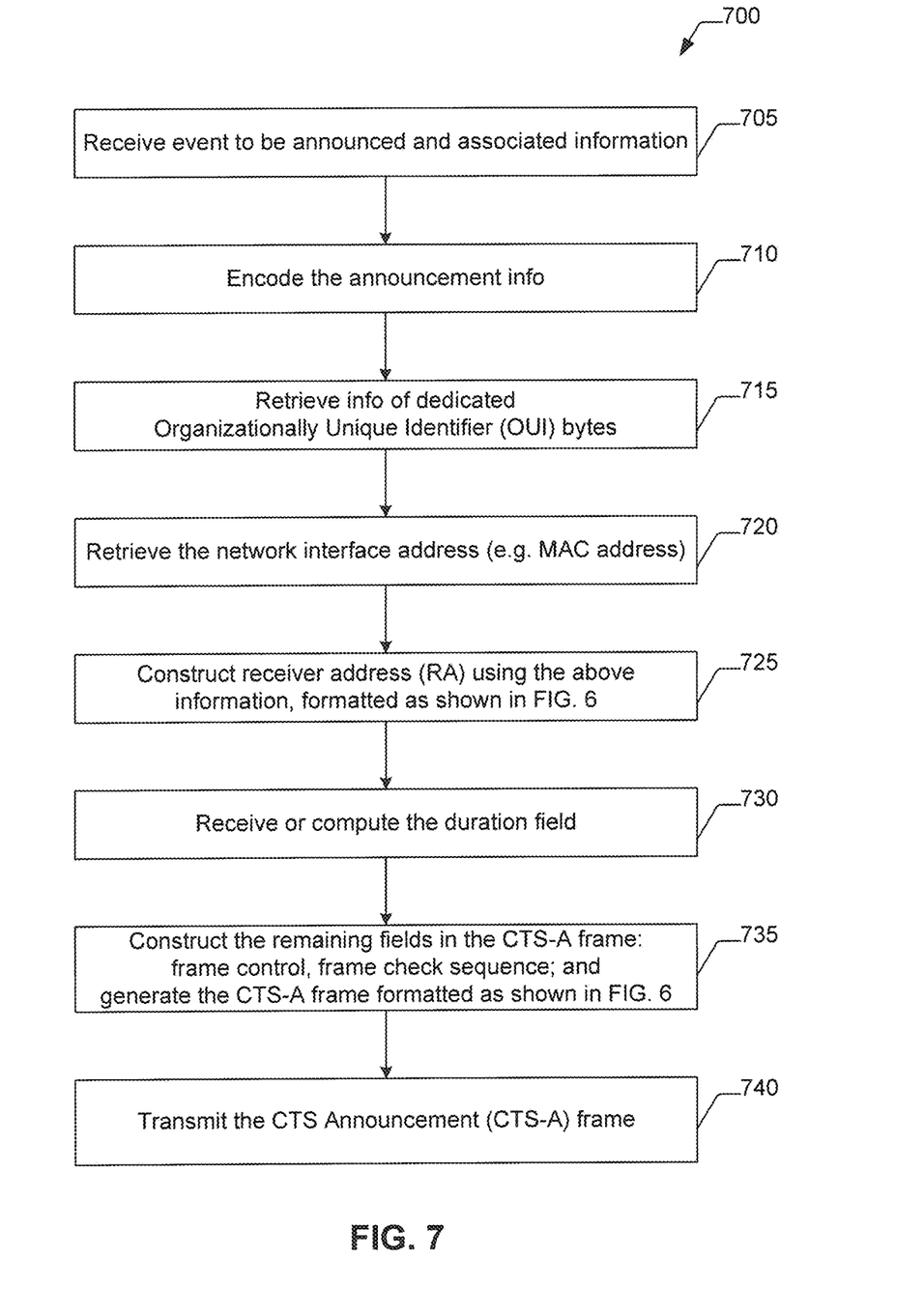
FIG. 7 illustrates a flowchart of a CTS-Announcement frame generation and transmission method according to an exemplary embodiment of the present disclosure.

FIG. 7 illustrates a flowchart 700 of a CTS-A frame generation and transmission method according to an exemplary embodiment of the present disclosure. The method of flowchart 700 is described with continued reference to one or more of FIGS. 1-6. The steps of the method of flowchart 700 are not limited to the order described below, and the various steps may be performed in a different order. Further, two or more steps of the method of flowchart 700 may be performed simultaneously with each other. Still further, the steps of flowchart 700 can be performed by wireless device 200, and more specifically, by the processor circuitry 205 in conjunction with the other elements of the wireless device 200.

The method of flowchart 700 begins at step 705, where an event to be announced and associated information is received. After step 705, the method of flowchart 700 transitions to step 710, where the event information is encoded into the announcement information 645. For example, the processor circuitry 205 can receive event information from host 210. Example events include a device calibration and/or flow control, among others.

The method of flowchart 700 then moves to step 715 and 720, where the information of a dedicated Organizationally Unique Identifier (OUI) and the MAC address is gathered. In an exemplary embodiment, the OUI (e.g., OUI 540) and MAC address is received at, for example, processor circuitry 205 from, for example, host 210, or retrieved from memory 206 with or without instruction from host 210. In operation, the information of the event to be announced, and/or OUI and MAC address can be received in response to one or more requests generated by the processor circuitry 205 and sent to the host 210.

After step 720, the method of flowchart 700 transitions to step 725, where the received OUI, portion of the network interface address (e.g. MAC address), and the encoded announcement information are assembled together, by the processor circuitry 205, to create the receiver address for a CTS-A frame. For example, the 3-byte OUI 640, one-byte announcement information 645 and the last two bytes of the MAC address 650 of the device can formulate a new address for the receiver address (RA) field 620 of the CTS-A frame 600.

After step 725, the method of flowchart 700 transitions to step 730, where a frame duration field 615 is computed or received by the processor circuitry 205. For example, the duration value can be received by processor circuitry 205 from host 210, and/or retrieved from the memory 206. It is also possible that the duration value is computed by the processor circuitry 205 based on the event to be announced.

After step 730, the method of flowchart 700 proceeds to step 735, where the remaining fields of the CTS-A frame 600, for example, the frame control field 610, frame check sequence (FCS) 625, are generated, for example, by processor circuitry 205. In operation, these fields (or information related thereto) can be received in response to one or more requests generated by the processor circuitry 205 that are sent to the host 210. In an exemplary embodiment, the processor circuitry 205 can be configured to generate the frame control field 610, the duration field 615, and/or the frame check sequence (FCS) field 625, which can be subsequently stored in, and retrieved from, memory 206.

After step 735, the method of flowchart 700 transitions to step 740, where the generated CTS-A frame 600 is transmitted. In an exemplary embodiment, the processor circuitry 205 can be configured to wirelessly transmit the CTS-A frame 600 using the transceiver 201.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and other hardware mediums. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
a transceiver configured to communicate with one or more other communication devices; and
processor circuitry communicatively coupled to the transceiver, the processor circuitry configured to:
generate a clear-to-send announcement (CTS-Announcement) frame including an organizational identifier and a network interface identifier; and
transmit, using the transceiver, the CTS-Announcement frame to the one or more other communication devices,
wherein the network interface identifier includes announcement information and a portion of an address that identifies the communication device to the one or more other communication devices.

2. The communication device of claim 1, wherein the organizational identifier uniquely identifies an organization or manufacturer associated with the communication device.

3. The communication device of claim 1, wherein the organizational identifier is assigned by the Institute of Electrical and Electronics Engineers (IEEE).

4. The communication device of claim 1, wherein the CTS-Announcement frame includes a receiver address field, and wherein the organizational identifier and the network interface identifier are included in the receiver address field.

5. The communication device of claim 4, wherein the receiver address field is six bytes, a first three bytes of the receiver address field being occupied by the organizational identifier and a last three bytes of the receiver address field being occupied by the network interface identifier.

6. The communication device of claim 1, wherein the announcement information occupies a first byte of the network interface identifier and the portion of the address that identifies the communication device occupies at least a second byte of the network interface identifier.

7. The communication device of claim 6, wherein the second byte and a third byte of the network interface identifier corresponds to a last two bytes of the address that identifies the communication device.

8. The communication device of claim 1, wherein the CTS-Announcement frame further includes a frame control field, a duration field and a frame check sequence.

9. The communication device of claim 1, wherein the announcement information comprises one of a protection mode, a calibration mode, an operational mode, or an operation activity.

10. The communication device of claim 9, wherein the protection mode is configured to identify support for one or more legacy protocols within a communication environment servicing the communication device.

11. The communication device of claim 9, wherein the calibration mode is configured to identify that the CTS-Announcement frame or one or more subsequently transmitted data frames is associated with one or more calibration procedures.

12. The communication device of claim 9, wherein the operational mode is configured to identify one or more coexistence functionalities supported by the communication device.

13. A communication device, comprising:
a transceiver configured to communicate with one or more other communication devices; and
processor circuitry communicatively coupled to the transceiver, the processor circuitry configured to:
generate a clear-to-send announcement (CTS-Announcement) frame including a network interface identifier, wherein the network interface identifier includes announcement information and a portion of an address that identifies the communication device to the one or more other communication devices;
transmit, using the transceiver, the CTS-Announcement frame to the one or more other communication devices;
generate a data frame; and
transmit, using the transceiver, the data frame to the one or more other communication devices after transmitting the CTS-Announcement frame.

14. The communication device of claim 13, wherein the CTS-Announcement frame includes a receiver address field, and wherein an organizational identifier and the network interface identifier are included in the receiver address field.

15. The communication device of claim 14, wherein the organizational identifier uniquely identifies an organization or manufacturer associated with the communication device.

16. The communication device of claim 14, wherein the receiver address field is six bytes, a first three bytes of the receiver address field being occupied by the organizational identifier and a last three bytes of the receiver address field being occupied by the network interface identifier.

17. The communication device of claim 13, wherein the announcement information occupies a first byte of the network interface identifier and the portion of the address that identifies the communication device occupies at least a second byte of the network interface identifier.

18. The communication device of claim 13, wherein the announcement information comprises one of a protection mode, a calibration mode, an operational mode, or an operation activity.

19. A method of operating a communication device to communicate with one or more other communication devices, the method comprising:
receiving announcement information associated with an upcoming event for the communication device;
generating a clear-to-send announcement (CTS-Announcement) frame including a network interface identifier, wherein the network interface identifier includes the announcement information and a portion of an address that identifies the communication device to the one or more other communication devices; and
transmitting, using a transceiver of the communications device, the CTS-Announcement frame to the one or more other communication devices.

20. The method of claim 19, wherein the announcement information occupies a first byte of the network interface identifier and the portion of the address that identifies the communication device occupies at least a second byte of the network interface identifier.

* * * * *